United States Patent [19]

Gadsden et al.

[11] Patent Number: 4,896,904
[45] Date of Patent: Jan. 30, 1990

[54] HEAT SHRINKABLE DEVICE WITH ADHESIVE BARRIER FOR CONNECTING ELONGATE OBJECTS

[75] Inventors: John A. Gadsden, Swindon; David E. Barnwell, Highworth, both of United Kingdom

[73] Assignee: Rachem Limited, Swindon, England

[21] Appl. No.: 73,394

[22] Filed: Jul. 13, 1987

Related U.S. Application Data

[63] Continuation of Ser. No. 668,605, Nov. 6, 1984, abandoned.

[30] Foreign Application Priority Data

| Nov. 8, 1983 | [GB] | United Kingdom | 8329787 |
| Feb. 13, 1984 | [GB] | United Kingdom | 8403696 |
| Feb. 15, 1984 | [GB] | United Kingdom | 8403927 |
| May 22, 1984 | [GB] | United Kingdom | 8413050 |
| Sep. 17, 1984 | [GB] | United Kingdom | 8423428 |

[51] Int. Cl.[4] .................................. F16L 47/02
[52] U.S. Cl. ................................ 285/381; 156/86; 174/DIG. 8; 285/909
[58] Field of Search ... 285/381, DIG. 909, DIG. 915; 156/86, 291, 158, 159, 304.2, 304.3; 403/273; 174/DIG.8, 23 R; 264/230

[56] References Cited

U.S. PATENT DOCUMENTS

| 2,027,962 | 1/1936 | Currie | 285/381 |
| 3,086,242 | 4/1963 | Cook et al. | 264/566 |
| 3,243,211 | 3/1966 | Wetmoore | 156/86 |
| 3,382,121 | 5/1968 | Sherlock | 156/86 |
| 3,526,683 | 9/1970 | Heslop et al. | 174/DIG. 8 |
| 3,610,291 | 10/1971 | Heslop | 156/86 |
| 3,708,611 | 1/1973 | Dinger | 474/84 C |
| 3,995,964 | 12/1976 | DeGroef | 403/273 |
| 4,018,733 | 4/1977 | Lopez | 260/27 EV |
| 4,092,193 | 5/1978 | Brooks | 285/41 |
| 4,120,083 | 10/1978 | Echols | 29/458 |
| 4,144,404 | 3/1979 | DeGroef | 174/88 C |
| 4,151,364 | 4/1979 | Ellis | 174/DIG. 8 |
| 4,181,775 | 1/1980 | Corke | 174/DIG. 8 |
| 4,197,880 | 4/1980 | Cordia | 138/99 |
| 4,245,674 | 1/1981 | Nakamura et al. | 138/DIG. 6 |
| 4,246,438 | 1/1981 | Gozlan | 174/DIG. 8 |
| 4,283,596 | 8/1981 | Vidakovits et al. | 174/DIG. 8 |
| 4,376,798 | 3/1983 | Diaz | 403/273 |
| 4,384,404 | 5/1983 | Watine | 285/381 |
| 4,424,990 | 1/1984 | White et al. | 285/381 |
| 4,434,320 | 2/1984 | Klein et al. | 285/381 |
| 4,440,821 | 4/1984 | Komura et al. | 174/DIG. 8 |
| 4,444,816 | 4/1984 | Richards et al. | 174/DIG. 8 |
| 4,456,784 | 6/1984 | Klein | 174/DIG. 8 |
| 4,460,728 | 7/1984 | Schmidt, Jr. et al. | 428/913 |
| 4,465,717 | 8/1984 | Crofts et al. | 428/40 |
| 4,487,994 | 12/1984 | Bahder | 174/DIG. 8 |
| 4,496,795 | 1/1985 | Konnik | 174/DIG. 8 |
| 4,504,699 | 3/1985 | Dones et al. | 174/DIG. 8 |
| 4,707,388 | 11/1987 | Park et al. | 156/86 |
| 4,709,948 | 12/1987 | Archer | 156/86 |
| 4,717,608 | 1/1988 | Meltsch | 156/86 |

FOREIGN PATENT DOCUMENTS

| 39228/68 | 12/1970 | Australia . | |
| A361747 | 3/1981 | Austria . | |
| 74218 | 3/1983 | European Pat. Off. . | |
| 0079702 | 5/1983 | European Pat. Off. . | |
| 0086110 | 8/1983 | European Pat. Off. . | |
| 1807233 | 8/1969 | Fed. Rep. of Germany . | |
| A1414511 | 9/1965 | France . | |
| 965467 | 7/1964 | United Kingdom . | |
| 1033959 | 7/1966 | United Kingdom . | |
| 1098304 | 1/1968 | United Kingdom | 174/DIG. 8 |
| 1384851 | 2/1975 | United Kingdom . | |
| 1556677 | 11/1979 | United Kingdom . | |
| 1594937 | 8/1981 | United Kingdom . | |
| 1603488 | 11/1981 | United Kingdom . | |
| 1604379 | 12/1981 | United Kingdom . | |

Primary Examiner—Richard E. Moore
Assistant Examiner—Eric K. Nicholson
Attorney, Agent, or Firm—Simon J. Belcher; Herbert G. Burkard

[57] ABSTRACT

A device for connecting a plurality of elongate objects, wherein a hollow, open-ended tube is provided which is at least partly dimensionally-recoverable, one or more bonding inserts formed from a solid, fusible, thermosetting adhesive located inside the tube for providing a permanent bond between the objects, and one or more barrier inserts located inside the tube to prevent egress of fused thermo-setting adhesive from the connection between the objects when the device is heated.

39 Claims, 4 Drawing Sheets

HEAT SHRINKABLE DEVICE WITH ADHESIVE BARRIER FOR CONNECTING ELONGATE OBJECTS

This application is a continuation of application Ser. No. 668,605, filed Nov. 6, 1984 now abandoned.

This invention relates to forming joints between bodies for example pipes, especially rigid pipes, that are used to convey fluids.

In many instances it is necessary to couple rigid pipes of small diameter, for example, a diameter of from about 2 to 50 mm, which are used in connection with electrical or mechanical equipment, for example in domestic and industrial refrigeration or air conditioning units or in hydraulic systems. These joints often need to function effectively under severe conditions, for example where fluids are conveyed along the pipes at elevated temperatures and pressures, for example, sometimes up to 150° C. and 40 atmospheres pressure, and where the pipes are under considerable stress, for example due to vibration of moving parts of the equipment or thermal expansion. For this reason, such pipes have hitherto usually been joined by means of metal screw-fit coupling pieces which are expensive and require the pipe-ends to be screw threaded, or by brazing which is a skilled and time consuming process. In addition, the use of brazed pipes has the disadvantage that if they fail in use, e.g. if a leak occurs in the brazed joint, it is relatively difficult to repair the joint by brazing, especially in the case of domestic equipment where the repair will need to be carried out in, for example, a domestic kitchen.

The present invention provides a device for connecting a plurality of elongate objects, which comprises a hollow open-ended tube which is at least partly dimensionally recoverable, one or more bonding inserts formed from a solid, fusible, thermosetting adhesive located inside the tube for providing a permanent bond between the objects, and one or more barrier inserts located inside the tube to prevent egress of fused thermosetting adhesive from the connection between the objects when the device is heated.

Usually both the objects will be hollow. For example one of the objects may be a pipe and especially a rigid pipe and the other hollow object may also be a pipe or it may be an inlet or outlet piece of a valve, gauge, tank or other container, end cap or a tubular connection piece for joining the pipe to one or more other pipes or any other such object. In most cases either both hollow objects will be rigid pipes, for example where a swaged joint is to be formed, or one object will be a pipe and the other will be a coupling piece therefore. Where pipes are to be joined, they may initially have dimensions such that one pipe may be inserted within the other or they may have substantially the same dimensions, in which case either a coupling piece will be required or the end of one pipe will be swaged open to receive the other.

Where one of the pipes is capable of receiving the other, they may be joined simply by inserting the end of one of the pipes within the end of the other, positioning a device according to the invention about the pipes so that the bonding insert is axially located at or adjacent to the end of outwardly located pipe, recovering the device about the pipes and heatinto the bonding insert to cause the thermosetting adhesive to melt and flow between the ends of the pipes.

The invention has the advantage that it enables a joint to be formed from a structural adhesive without the necessity of any jigging to retain the joint as the adhesive sets. In most cases the joint will have sufficient strength as soon as it has been formed to allow the pipes (or other objects) to be used or to allow further manufacturing operations to be conducted on the equipment containing them without the risk of failure of the joint. This is particularly important in automated production processes where only a short period of time may be allocated to each operation.

A further advantage of the invention is that it enables pipes made of different materials, for example copper, steel and aluminium pipes, to be easily connected together. Prior to this invention such a connection involved complex brazing or other difficult and/or expensive techniques.

In addition the tube ruggedizes the ring of thermosetting adhesive and, when the device is being installed, the recovery of the tube about the adhesive provides some force to squeeze the adhesive between the pipes and so increases the reliability of the connection. Moreover, since the operations required in order to install the device are relatively simple and straightforward, the quality of the completed joint is relatively independent of the skill of the operator.

In many instances the device will be intended to be used to couple a male pipe that is to be inserted within a female pipe in which case the device is preferably arranged so that the barrier insert is located adjacent to the bonding insert and on that side of the bonding insert which is remote from the female part or will, in use, be remote from the female part, of the joint, so that the barrier insert will be caused to contact the male part of the joint. In this way, recovery of the heat-recoverable tube will force the fused thermosetting adhesive between the male and the female parts of the joint while the barrier insert restricts the fused thermosetting adhesive from flowing away from the joint.

Preferably the or each barrier insert is fusible or deformable at the temperature required to produce an adequate level of cure in the adhesive of the bonding insert.

When the device is being installed, heat is applied causing the adhesive of the bonding insert to melt and to start to cure. Heating is maintained until the adhesive reaches a certain temperature (hereinafter referred to as the optimum temperature) which, after allowing the adhesive to cool, results in an adequate level of cure. By adequate level of cure is meant at least 40% gel, preferably at least 50% qel and more preferably at least 70% gel in the cured adhesive. The value of the optimum temperature depends for example, upon the nature of the adhesive and the time allowed for heating the adhesive. Preferably heating times are less than 5 minutes, and more preferably less than 1 minute. The optimum temperature for epoxy adhesives, for example, is usually in the range of 100°–220° C., more usually 150°–200° C. and especially 165°–195° C. It is, however, difficult for the installer to determine when the adhesive reaches this optimum temperature and thus that sufficient heat has been supplied. The material of the or each barrier insert of the present invention is thus selected such that it will fuse at or near the optimum temperature in order to give a visual indication to the installer that sufficient heat has been supplied to the device. Preferably the barrier insert material is chosen such that it will fuse within 10° C. of the optimum temperature, more preferably within 5° C. It is especially preferred that the material will fuse just below the optimum temperature.

Preferred barrier inserts have a relatively sharp melting point, by which is meant a melting point range of no more than 40° C., preferably no more than 20° C., and especially no more than 10° C. when measured by a Differential Scanning Calorimeter at a heating rate of 10° C. per minute. In addition to giving a precise visual indication that the optimum temperature has been reached, a sharp melting point enables the barrier insert to remain solid up to a relatively high temperature so that it acts as a barrier to prevent the fused thermosetting adhesive flowing away from the joint. It is also possible, however, to have two separate inserts in the device, one as a barrier to the adhesive and the other as a temperature indicator.

Alternatively, or in addition to this method of visual indication, a thermochromic indicator, such as a thermochromic paint, may be applied, for example, to the outer surface of the dimensionally recoverable tube or to the outer surface of the barrier insert. The thermochromic indicator is be chosen such that it changes color when the optimum temperature is reached. Another method of providing a visual indication that the optimum temperature has been reached is to choose a thermosetting adhesive that changes color on curing.

Preferably each barrier insert is attached to its respective bonding insert in order to facilitate handling of the thermosetting adhesive during manufacture of the device.

Preferably the barrier insert is in the form of a ring having a flange portion that extends axially from the periphery of the ring so that the barrier insert extends over one end face and over the outer circumferential surface of the bonding insert. To facilitate manufacturing, it is preferred that the outer wall of the ring portion of the barrier insert is tapered so that the ring is frustoconical in shape. The bonding insert may be bonded to the barrier insert, for example by means of a pressure sensitive, contact, cyanoacrylate or anaerobic adhesive or the two inserts may be so formed to enable the bonding insert to be pushed into the barrier insert and held by friction. The use of such a barrier insert enables the manufacture of the devices to be facilitated since it will protect the relatively fragile thermosetting adhesive from mechanical abuse before and during manufacture. In addition the barrier insert significantly improves the robustness of the manufactured device since it reduces or eliminates the likelihood of the thermosetting adhesive ring breaking when the connector is mishandled, e.g. when it is dropped or severely squeezed.

Preferably the or each of the barrier inserts is conformable to the shape and/or size of the object to be connected, in which case it is preferably formed from a fusible material having a melt viscosity sufficiently higher than that of the thermosetting adhesive to prevent egress of the fused thermosetting adhesive, but low enough such that it will flow upon fusing, allowing the heat-recoverable tube to recover further onto the pipe, giving a clear visual indication that installation is complete, or it is formed from a heat-shrinkable polymeric material, and preferably one that has a recovery temperature close to or below that of the recoverable tube. Suitable materials that may be used to form the barrier inserts include, for example, non-crosslinked thermoplastics such as polyamides, low, medium or high density polyethylene, ethylene copolymers, e.g. ethylene/vinyl acetate copolymers or polyvinylidene fluoride. Nylon 11 and nylon 12 are especially preferred materials. Alternatively the barrier insert may be formed from a crosslinked polymeric material which will become sufficiently soft to deform under the recovery forces of the recoverable tube without melting when the device is heated.

As stated above, the tube is dimensionally-recoverable. Preferably it is dimensionally heat-recoverable. Heat-recoverable articles may, for example, be produced by deforming a dimensionally heat-stable configuration to a dimensionally heat-unstable configuration, in which case the article will assume, or tend to assume the original heat-stable configuration on the application of heat alone.

According to one method of producing a heat-recoverable article the polymeric material is first extruded or moulded into a desired shape. The polymeric material is then cross-linked or given the properties of a cross-linked material by means of chemical cross-linking initiation or by exposure to high energy radiation, for example, a high energy electron-beam or gamma radiation. The cross-linked polymeric material is heated and deformed and then locked in the deformed condition by quenching or other suitable cooling methods. The deformed material will retain its shape almost indefinitely until exposed to a temperature above its crystalline melting temperature, for example about 120° C. in the case of polyethylene. Examples of heat-recoverable articles may be found in U.S. Pat. No. 2,027,962 and U.S. Pat. No. 3,086,242 the disclosures of which are incorporated herein by reference. As is made clear in U.S. Pat. No. 2,027,962, however, the original dimensionally stable heat-stable configuration may be a transient form in a continuous process in which, for example an extruded tube is expanded, while hot, to a dimensionally heat unstable form.

Where the device is dimensionally heat-recoverable it may be easily arranged so that the heat applied to the device to cause it to recover will also cause the thermosetting adhesive to melt and flow.

In one preferred arrangement of the device, a portion of the recoverable tube at or near one end region thereof, preferably the end next to the barrier insert, is partially recovered. This arrangement is especially advantageous when two pipes of differing diameters are to be connected.

The material for forming the tube is preferably formed from rigid plastics (as defined in ASTM 883-75a) and those semi-rigid plastics having an elastic (Young's) modulus of at least 250 MPa. Such materials usually have a yield strain of at least 10% and generally not more than 100%. Rigid and semi-rigid plastics as defined above that are capable of being rendered dimensionally-recoverable and are therefore suitable for forming the tube include polyolefins, for example, low or high density polyethylene, polypropylene, ethylene copolymers, for example with propylene, butene, vinyl acetate or ethyl acrylate, polyesters, polyether sulphones, polyphenylene oxide, polyvinyl chloride and fluoropolymers for example polychlorotrifluoroethylene, polytetrafluoroethylene and polyvinylidene fluoride, or polyamides, such as those described in U.S. Pat. No. 4,444,816 the disclosure of which is incorporated herein by reference, for example nylon 66, nylon 610, nylon 11 and nylon 12. Preferred materials for forming the tube are those having an elastic (Young's) modulus of at least 500 MPa especially at least 1 GPa, more especially of at least 2 GPa, a yield stress of from 5 to 75

MPa, especially from 40 to 60 MPa, and an ultimate tensile strength of at least 10 MPa, especially at least 30 MPa. The most preferred materials are polyvinylidene fluoride and nylon 11 or 12.

Preferred thermosetting adhesives for use as the bonding insert include phenolic adhesives, e.g. B-staged phenolic adhesives, or preferably epoxy adhesives. The epoxy adhesive may be a B-staged adhesive. Preferably, however, the epoxy is a latent cure adhesive, and the epoxy resin and the curing agent may exist as separate particles that are mixed together as described in U.S. Pat. No. 411,184, filed Aug. 25, 1982, now abandoned the disclosure of which is incorporated herein by reference. Whatever thermosetting adhesive is used, it preferably has a minimum melt viscosity in the range of from 25 to 400 poise, especially from 50 to 250 poise and most especially from 100 to 175 poise during the installation of the device. The melt viscosity may be measured using a Ferranti Shirley cone and plate viscometer fitted with a small cone and measuring the viscosity at 5 cycles per minute. Preferably the adhesive has a melting point of not higher than 160° C., more preferably not higher than 120° C. and especially not higher than 100° C. Preferred adhesives are those that will cure, or at least begin to cure within 5 minutes, preferably within 1 minute and especially within 30 seconds at 150° C. Also, it is preferred for the adhesive to have a storage life at 23° C. of at least 1 year.

Preferably the dimensionally recoverable tube has a quantity of adhesive on at least part of its inner surface to provide at least a temporary bond between the tube and at least one of the elongate objects. This quantity of adhesive is preferably a hot-melt adhesive, most preferably an adhesive having a melting point below 175° C. Preferably the adhesive has a relatively high melt viscosity, e.g. a melt viscosity in the range of from 1500 to 3000 poise and especially from 1750 to 2250 poise at 180° C. Alternatively or in addition it is preferred for the adhesive to have a ring-and-ball softening point of at least 100° C., more preferably at least 125° C. and especially at least 150° C., and to exhibit a lap shear strength to metal substrates, e.g. aluminium, steel or copper, of at least 20N $(25 \text{ mm})^{-2}$ at 100° C. and at least 100N $(25 \text{ mm})^{-2}$ at 23° C. In addition it is desirable for the adhesive to be resistant to fluids commonly found in such environments, e.g. compressor oils, halohydrocarbon refrigerants, water, detergents and the like. The preferred hot melt adhesives are polyamide adhesives and especially, the adhesives described in U.S. Pat. Nos. 4,018,733 to Lopez et al and 4,181,775 to Corke, the disclosures of which are incorporated herein by reference.

Other adhesives that may be used include vinyl and acrylic homo- and copolymer, polyester and polyolefin hot-melt adhesives or thermosetting adhesives, for example those based on epoxy-polyamide, epoxy-phenolic, epoxy-nitrile rubbers and one-part resin films.

If desired a small protective tube may be provided over at least part of the layer of additional adhesive in order to allow easy removal of the mandrel on which the device is formed during manufacture. This protective tube is especially required if the dimensionally recoverable tube is partially recovered. The protective tube may be an extension of the barrier insert, for example a tubular portion that extends axially from the barrier insert ring on the opposite side of the flange portion. Suitable materials for the protective tube include polyamide, especially nylon 11 and nylon 12, or polyvinylidene fluoride, which may be uncross-linked or cross-linked.

The recoverable tube preferably has an initial wall thickness (that is, wall thickness before expansion) of at least 0.1 mm. The maximum wall thickness is usually determined by the ability of thick-walled tubes to recover when heated. This will depend on a number of factors including the diameter of the tube and the polymeric material used to form it. The tube preferably has an initial wall-thickness of not more than 3 mm and especially an initial wall-thickness of from 0.25 to 0.75 mm.

According to another aspect, the invention provides a device for connecting a plurality of elongate objects, which comprises a rigid open-ended tube that is capable of being joined to the elongate objects to form a connection between the objects, the tube having at least one dimensionally recoverable skirt in the region of an end thereof which is capable of being recovered about the joint between the rigid tube and one of the objects, the device having a bonding insert formed from a solid, fusible, thermosetting adhesive for providing a permanent bond between the rigid tube and the object.

Preferably the rigid tube is provided with a skirt and a corresponding bonding insert in the region of each end thereof so that each joint between the rigid tube and an object will be enclosed by a recovered skirt. If the rigid tube is intended to be positioned over the ends of the objects to be connected, the skirt or skirts may have substantially the same diameter as that of the rigid tube and may simply form axial extensions of the rigid tube. If, however, the ends of the rigid tube are intended to be positioned within the ends of the pipes to be connected, the skirt or skirts should extend around the ends of the rigid tube and be separated therefrom by an annular space which receives the ends of the pipes.

This form of device is particularly useful for forming in situ repairs in existing pipes, for example in domestic equipment or in installed pipework, in which the installed pipe has failed, for example due to a faulty joint or where the pipe has burst. The pipe may be repaired simply by cutting out an appropriate length of the failed pipe, and then connecting the remaining pipes by joining the end of each of the pipes to an end of the open-ended rigid base, recovering the or each skirt about the rigid tube and its respective pipe, and heating the or each bonding insert to cause the thermosetting adhesive to melt and flow between the rigid tube and the pipe joined thereto. As described above, it is preferred for the or each skirt to be heat-recoverable so that the heat applied to the device to cause the skirt or skirts to recover will also cause the adhesive to melt.

Preferably the or each skirt also contains a barrier insert to restrict flow of fused thermosetting adhesive away from the connection when the device is heated. Preferably the or each skirt has a quantity of an additional adhesive, especially a hot-melt adhesive as described above, on its inner surface for forming at least a temporary bond between the tube and the pipe.

The thermosetting adhesive, barrier insert, additional adhesive and the heat-recoverable material forming the skirt are both preferably the same as those described above. In the preferred form of device the skirts are formed by partially recovering one or more connector devices described above onto the rigid tube.

The rigid open-ended tube may, if desired, have an internal or external shoulder in order to limit the extent of insertion of the pipe within the rigid tube or vice versa. The rigid tube may be formed from a rigid composite, in which case the shoulders may be formed when the tube is moulded, or it may be formed from a metal, e.g. copper or steel, in which case the shoulders may be formed by swaging the ends of the tube outwards or inwards.

At least one and preferably each end region of the rigid tube is flared outwards to aid flowing of the fused thermosetting adhesive between the rigid tube and the pipe to be connected.

The flared end region is preferably in the form of a frusto-conical portion in which the wall of the rigid tube tapers outwardly in a direction toward the end of the rigid tube at an angle in the range of from 0.5° to 2°, especially from 0.75° to 1.5° and most especially about 1° to the axis of the rigid tube. Preferably the axial length of the frusto-conical portion is at least 6 and more preferably at least 9 mm but usually not more than about 20 mm, the optimum length being about 12 mm.

In addition to the frusto-conical portion, the end of the rigid tube is preferably in the form of a frusto-conical lip which is located adjacent to the frusto-conical portion, and also tapers outwardly toward the end of the rigid tube to a greater extent, for example at an angle of from 10° to 40°, especially from 15 to 30°. The axial length of the lip is preferably in the range of from 1 to 4 mm, especially from 1.5 to 3 mm and most especially about 2 mm. This frusto-conical lip enables a relatively thick fillet of thermosetting adhesive to form at the lip when the device is installed, which reduces the stress concentrations at the end of the joint.

Preferably the end of the said frusto-conical portion nearest the center of the rigid tube is adjacent to a cylindrical portion of the rigid tube of constant diameter, the cylindrical portion having a diameter such that it can receive the pipe to be joined with a snug fit. The cylindrical portion may have the same diameter as the central region of the rigid tube or it may be of slightly larger diameter and be joined to the central region by an internal shoulder.

According to another aspect, the invention provides a kit for connecting a plurality of elongate objects which comprises a rigid hollow open-ended tube and a plurality of dimensionally recoverable tubular sleeves each of which contains an insert formed from a solid, fusible thermosetting adhesive, each sleeve being capable of being positioned about the rigid tube and end of one of the objects and recovered thereon so that the thermosetting adhesive forms a permanent bond between the rigid tube and object. Preferably the or each sleeve comprises a device according to the first aspect of the invention. The rigid tube is preferably identical to that described above.

The above invention has been described with reference to connecting two hollow pipes. However other elongate bodies may also be connected with the device, an example being a connection between a hollow pipe and a solid plug. Also more than two elongate objects, for example three or four objects, may be connected together using a device according to the invention.

In a further aspect the invention provides a device for terminating a hollow object which comprises a rigid element for closing the hollow object, the rigid element having a dimensionally recoverable skirt in the region of an end thereof and capable of being recovered about the joint between the rigid element and the object, the device having a bonding insert formed from a solid, flexible, thermosetting adhesive for providing a permanent bond between the element and the object.

By hollow object is meant, for example, a pipe or an outlet, and by rigid element is meant, for example, a tube with a closed end or a solid plug. In other respects the device according to this aspect of the invention is as described above.

Several devices in accordance with the present invention will now be described by way of example with reference to the accompanying drawings in which.

Figure 1:
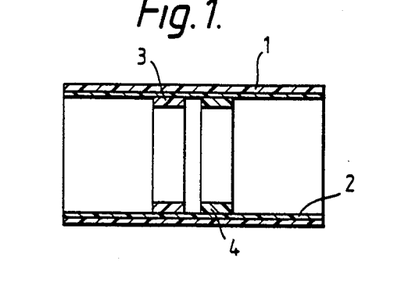
FIG. 1 is a sectional elevation of a form of connector device in accordance with the invention.
Figure 2:
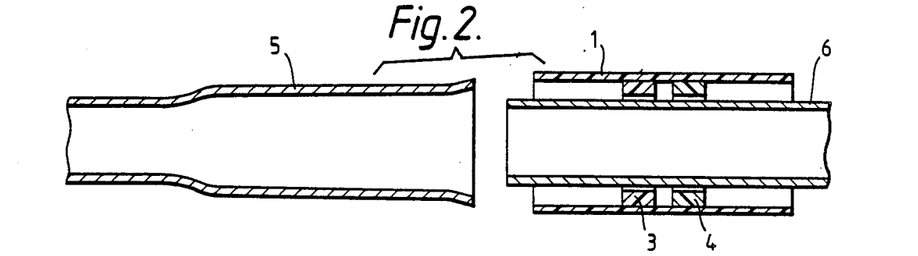
FIGS. 2 to 5 illustrate the use of the device shown in FIG. 1 for forming a connection between a pair of pipes.

FIG. 1 shows one form of device which comprises a hollow heat-shrinkable, cross-linked polyvinylidene fluoride tube (1) which has a recovery temperature of approximately 165° C., and lining of polyamide hot-melt adhesive (2) along the entire length of the tube 1. The tube contains a bonding insert (3) in the form of a ring of a solid, fusible, epoxy adhesive bonding insert having a melting point of approximately 80° C. and an initial curing point of approximately 105° C., and an annular, solid fusible barrier insert (4) which is made of nylon 12 and has a melting point of approximately 177° C. Although the bonding and barrier inserts may be separate, as shown, it is preferred that there is substantially no gap between the two inserts.

Figure 3:
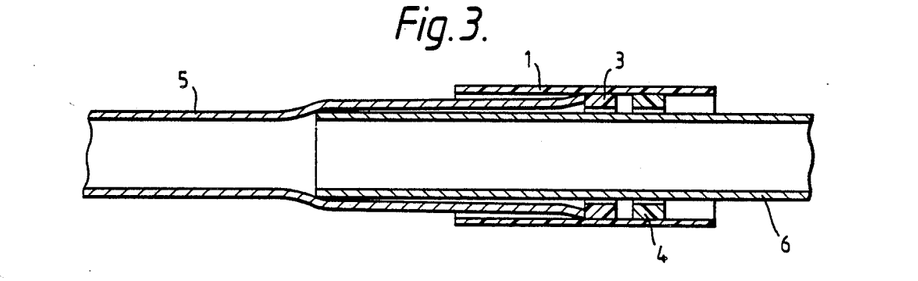
Figure 4:
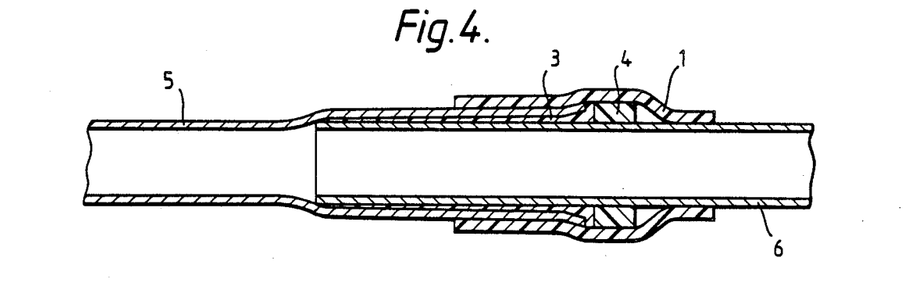
Figure 5:
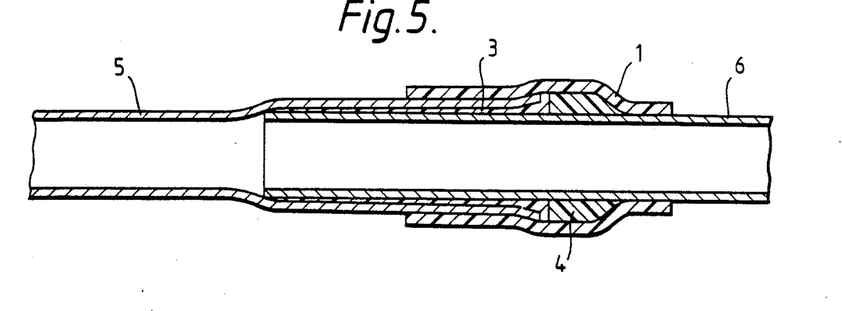

FIGS. 2 to 5 show a method of connecting a pair of pipes (5) and (6) by means of the device shown in FIG. 1. The end of pipe (5) is first swaged open to receive pipe (6). Preferably the end of pipe (5) is swaged open to a similar configuration as that of the end regions of the rigid tube (35) in FIG. 14. Then, after slipping the device over the end of pipe (6), pipe (6) is pushed into the end of pipe (5), and the device is then moved axially along pipe (6) until the bonding insert (3) is adjacent to the end of pipe (5) as shown in FIG. 3. The size of the device may conveniently be such in relation to the diameter of pipe (5) that when the device has been moved to its correct position, the end of pipe (5) abuts the epoxy ring. When the device is in the correct position, it is simply heated by means of a hot air gun to cause the tube (1) to recover, the hot-melt adhesive (2) to melt and form a bond to the pipes (5) and (6), and the bonding insert to melt and flow between the pipes, as shown in FIG. 4. At this stage the barrier insert (4) remains solid and prevents the fused epoxy adhesive from flowing along the pipe (5) away from the connection and forces the adhesive towards the connection to form a permanent bond between the two pipes. Further heating, giving a total heating time of under 1 minute, causes the barrier insert (4) to melt and flow, as shown in FIG. 5, indicating that an optimum temperature of approximately 177° C. has been reached. The tube (1) recovers further over the melted barrier insert (4) and thus the installer knows that sufficient heat has been supplied to the device.

Figure 6:
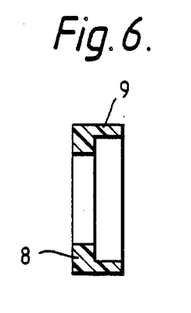
FIG. 6 is a sectional elevation through one form of barrier insert used in a connector according to the invention.

FIG. 6 shows a barrier insert made, for example, by injection moulding, and formed from nylon 12 having an outer diameter of 10.5 mm and a bore of 6.45 mm. The barrier insert comprises an annular portion (8) of 1.5 mm wall thickness and a flange portion (9) of 0.75 mm radial wall thickness and 2.5 mm axial length. A thermosetting adhesive, preferably epoxy, ring (not shown) is positioned within the barrier insert so that it fits snugly inside the flange portion and one end face thereof abuts the inner side face of the annular portion (8), the other end face of the adhesive insert preferably being flush with the end of the flange portion (9).

Figure 7:
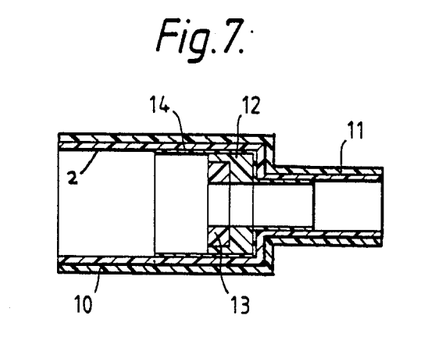
FIGS. 7 and 8 are sectional elevations through various forms of connector according to the invention.

FIG. 7 shows another form of device for forming a direct joint between two pipes wherein one pipe is of small diameter than the other pipe. The device comprises a heat-shrinkable tube (10) formed from crosslinked polyvinylidene fluoride, of which one end (11) has been partially recovered for easier fitting around the pipe of smaller diameter. The tube (10) and (11) is provided with a thin layer of polyamide hot-melt adhesive 2 on its inner surface. A nylon 12 barrier insert (12) of the form shown in FIG. 6, is located within the tube (10) adjacent to the partially recovered portion (11), and an epoxy bonding insert (13) is positioned within the barrier insert (12). If desired a small protective tube (14) of uncoated, thin walled recoverable material may be provided between the heat recoverable tube (10) and (11) and the barrier insert (12) in order to allow easy removal of the mandrel on which the device is formed during manufacture. In order to form a joint, the device is slipped over the end of one of the pipes and after the pipe ends have been pushed together the device is positioned over the joint so that the end of the larger pipe abuts the exposed end face of the bonding insert (13) or the end edge of the flange portion of the barrier insert (12). The device is then heated as described above.

Figure 8:
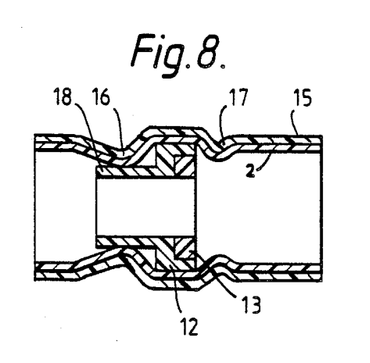

The device shown in FIG. 8 comprises a tube (15) which has been partially recovered (16) and (17) around the barrier insert (-12) In this device a protective tube (18), which prevents the inner layer of adhesive (not shown) on the recovered portion (16) of the tube from sticking to the mandrel during manufacture, is formed as an integral part of the barrier insert and is made from nylon 12.

Figure 9:
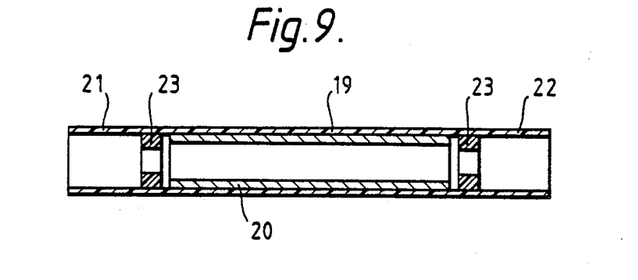
FIGS. 9 to 15 illustrate further embodiments the invention, each incorporating a rigid tube.

FIG. 9 shows a form of device according to the invention in which a heat-shrinkable polyvinylidene fluoride sleeve (19) which is provided with an internal lining of a polyamide hot-melt adhesive 2, is located over a rigid copper tube (20). The sleeve (19) is longer than the rigid tube (20) so that the ends of the sleeve (19) extend beyond the ends of the rigid tube (20) in the form of a pair of skirts (21), (22). An epoxy bonding insert (23) is located within each skirt adjacent to the end of the rigid tube (20). In this embodiment, the pipes to be connected are simply pushed into each end of the skirts (21),(22) and the device is heated, causing the heat-shrinkable skirts to recover onto the pipes and causing the bonding insert to melt.

Figure 10:
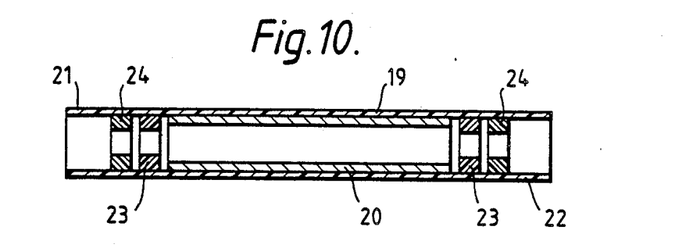

FIG. 10 shows the device of FIG. 9 with barrier inserts (24) formed from a thermoplastic material or a heat-shrinkable material located within each skirt (21),(22) adjacent to the bonding insert (23) and on that side of the bonding insert remote from the rigid tube (20). When the device is heated, the barrier inserts (24) prevent the fused epoxy adhesive of the bonding inserts (23) from flowing along the pipes away from the joints.

Figure 11:
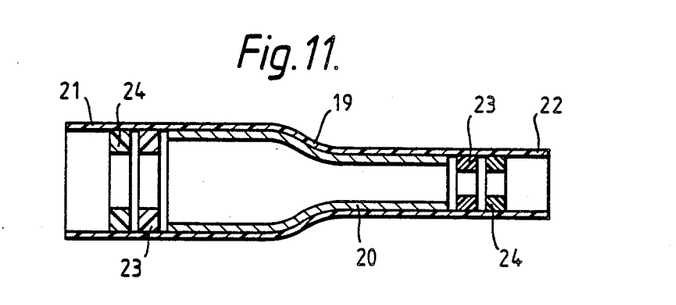

A modification of the device of FIG. 10 is shown in FIG. 11 in which the rigid tube (20) varies in diameter between its end regions to provide a transition between pipes of differing diameter.

Figure 12:
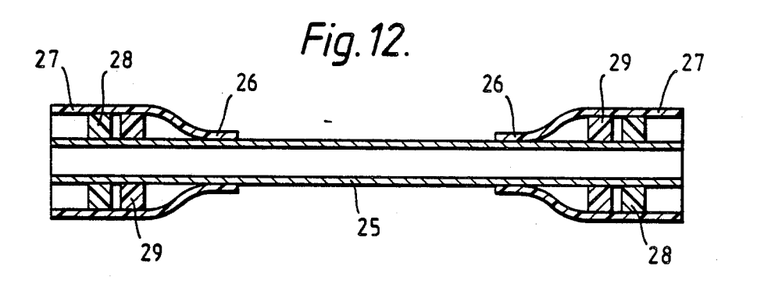

A further form of device is shown in FIG. 12 in which a rigid copper tube is intended to act as the male part of the joints to the pipes to be connected. The rigid tube (25) is provided at each end with a connector device (26) similar to that shown in FIG. 1. Each connector device is partially recovered onto the rigid tube (25) in order to form a skirt (27) that extends around the end region of the rigid tube. Each skirt (27) contains an epoxy bonding insert (28) and, adjacent to the bonding insert and on the side of the bonding insert remote from the ends of rigid tube (25), a barrier insert (29) as described above. The pipes to be connected are pushed over the ends of the rigid tube (25) until their ends abut the bonding inserts (28) and the skirts are recovered about the pipe ends as described above. The barrier inserts (29) prevent fused epoxy adhesive being formed away from the pipes under the partially recovered sections of the skirts.

Figure 13:
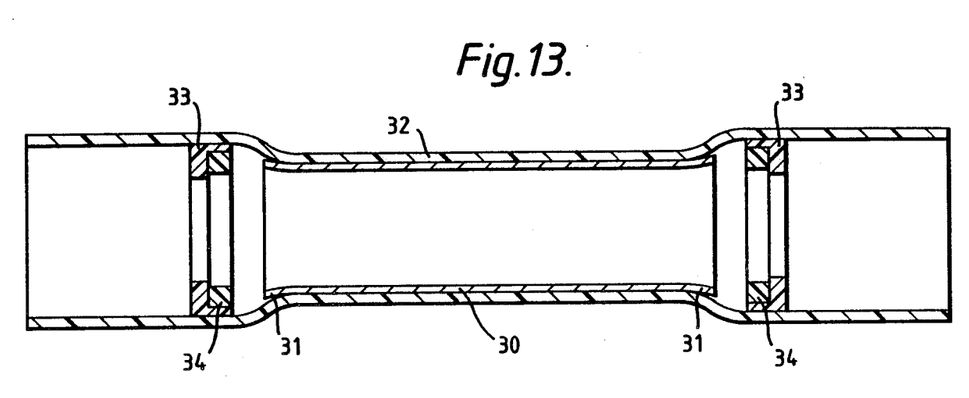

FIG. 13 shows a modified version of the device of FIG. 10 in which a rigid metal tube (30) has two slightly flared open ends (31) and a heat-shrinkable tube (32) formed from cross-linked polyvinylidene fluoride is positioned over, and partially recovered onto, the rigid tube. The rigid tube (30) is provided with a thin coating of polyamide hot-melt adhesive (not shown) for retaining the rigid tube (30) and inserts therein and for providing a temporary bond to the pipes during installation. A nylon 12 barrier insert (33), of the type shown in FIG. 6, together with an epoxy bonding insert (34) is located within each end of the heat-shrinkable tube (32) adjacent to each end of the rigid tube (30) so that the bonding insert (34) faces the rigid tube end.

Figure 14:
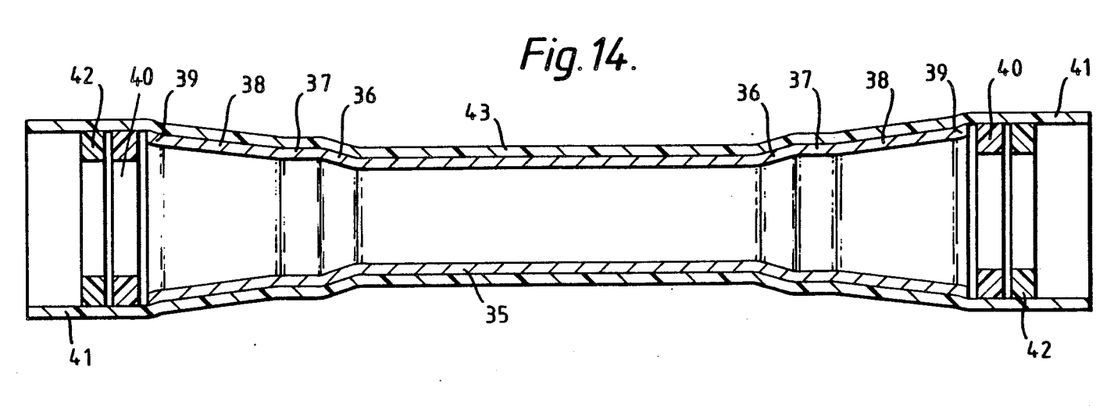

FIG. 14 shows a modification of the device of FIG. 13. Each end region of the rigid tube (35) has an internal shoulder (36) and a cylindrical portion (37) of constant diameter. Adjacent to the cylindrical portion (37) a frusto-conical region (38) is formed in such a way that the wall tapers outwardly from the axis of the tube at an angle alpha to the axis of 1° (the lateral dimensions of the end region of the rigid tube being exaggerated in the drawing for the sake of clarity), and, adjacent to the frusto-conical region (38) the tube ends in a frusto-conical lip (39) which tapers outwards from the axis at an angle of about 30°. The axial length of the frusto-conical region (38) is about 12 mm, and of the lip (39) about 2 mm. The axial length of the cylindrical region is about 2.5 to 3.5 mm. The volume of thermosetting adhesive in the bonding insert (40) is preferably greater than, e.g. at least 1.5 times, and especially at least twice, the volume of the gap between the internal surface of the tube in the region of the frusto-conical portion (38) and lip (39), and the external surface of a pipe inserted therein. The device is intended to be used to join two pipes of outer diameter substantially equal to the internal diameter of the cylindrical portion (37) so that the cylindrical portion (37) will fit snugly about the end of the pipe.

In order to join two pipes, each pipe is inserted into one end of the rigid tube (35) until their ends abut the internal shoulder (36), and the device is then heated for example by means of hot air gun until the heat-recoverable skirts (41), which form part of the heat-recoverable tube (43), have recovered into conformity with the pipes, the thermosetting adhesive has flowed and the barrier inserts (42) have fused indicating that installation is complete. When the device is heated the thermosetting adhesive forming the bonding insert (40) will fuse and will be forced into the frusto-conical region (38) between the rigid tube (35) and the pipe to be joined by the recovery force of the heat-recoverable skirt (41), the flow of the adhesive away from the rigid tube (35) being prevented by the barrier inserts (42). The connection formed between the pipes in this way is mechanically robust and is capable of withstanding significant pull-out, bending, torsional and vibrational loads, and also of withstanding high internal fluid pressures even at elevated temperatures, e.g. above 100° C.

It will be appreciated that the end regions of the rigid tube (35) need not be identical as shown in the drawing, but may for example differ in size, e.g. length or in the tube diameter, or, if desired, only one end of the tube may be provided with the configuration shown.

Figure 15:
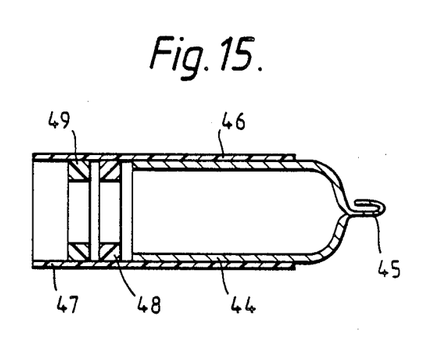

FIG. 15 shows a device for terminating a hollow body such as a pipe or an outlet, and comprises a rigid metal tube (44) of which one end (45) has been closed by crimping and folding the end back. A heat-recoverable tube (46) is positioned over the rigid tube (44), one end of the recoverable tube (46) extending over the open end of the rigid tube (44) to form a heat-recoverable skirt (47). A bonding insert (48) and a barrier insert (49) are located inside the recoverable skirt (47), the bonding insert (48) being adjacent to the rigid tube (44). To terminate a pipe, for example, the end of the pipe is inserted into the recoverable skirt and the device is heated causing the heat-shrinkable skirt to recover onto the pipe and causing the bonding insert to melt and form a permanent seal between the pipe and rigid tube (44).

A device according to FIG. 7 without the protective tube (14) was manufactured and comprised a cross-linked polyvinylidene heat-shrinkable tube having a maximum internal diameter of 10.5 mm and a minimum internal diameter of 6.5 mm and a heat-recovery temperature of 165° C. The barrier insert was made of nylon 12 and the bonding insert was made of a thermosetting epoxy adhesive comprising a diglycidyl ether of bisphenol A, and dicyandiamide. The epoxy adhesive had a melting point of 80° C., an initial curing temperature of 105° C., and a minimum melt viscosity of 142 poise at 150° C. The heat-shrinkable tube was provided with an inner layer of hot-melt adhesive comprising a blend of polyamide and ethylene acrylic terpolymer having a ring and ball softening point of 155° C. and a melt viscosity of 1900 poise at 180° C. A strip of thermochromic indicator was painted along the length of the outer surface of the heat-shrinkable tube. This indicator changes from green to black at 260° C.

This device was used to connect two metal pipes together. The first pipe had an external diameter of 6.4 mm (¼ inch) and was made of copper, and the second pipe had an external diameter of 7.9 mm (5/16) inch and was made of steel. Both pipes had a wall thickness of 0.71 mm. One end of the steel pipe was swaged open to form a frusto-conical portion such that the wall of the frusto-conical portion tapered outwardly from the longitudinal axis of the pipe at an angle of 1° and the axial length of the frusto-conical portion was 12 mm. A frusto-conical lip was formed adjacent to the frustoconical portion at the end of the pipe, and tapered outwards from the pipe axis at an angle of 30° and had an axial length of 2 mm.

Before installing the device the pipes were first cleaned by abrading the end regions with a medium grade abrasive paper and then decreasing them with 1,1,1-trichloroethane.

The device was then slipped over the copper pipe and the end of the copper pipe firmly inserted into the frusto-conical portion of the steel pipe. The device was then positioned over the joint between the two pipes such that the steel pipe abutted the barrier insert. Using a hot air gun with a reflector attachment, which provided an air flow of 450° C. in the centre of the reflector, the device was heated causing the tube to shrink and the epoxy bonding insert to melt and flow into the joint.

After heating for 45 seconds the barrier insert melted thereby enabling the tube to recover further indicating that enough heat had been applied such that the adhesive had been heated to at least 177° C. which would result in a cure of at least 70% gel when the adhesive was cooled. The thermochromic paint also changed color indicating that installation was complete, and the hot-melt adhesive exuded from the ends of the heat-recoverable tube.

The installed device was left undisturbed to cool for 4 minutes, allowing the adhesive to cure.

Twenty-four hours after installing the device, the joint was subjected to the following tests with the following results:

| Test | Result |
| --- | --- |
| Burst Strength | |
| Hydraulic testing at 150°C | Withstand 141 bar for at least 313 hours |
| Mechanical Strength | |
| 1. Bending—10 deflections through 15° | Leak rate at 150°C of less than 0.12g per annum of R12 refrigerant gas |
| 2. Torsion—2.5NM torque | Leak rate at 150°C of less than 0.15g per annum of R12 refrigerant gas |
| 3. Vibration—3OHz at 1mm amplitude for 2.5 million cycles | Leak rate at 150°C of less than 0.10g per annum of R12 refrigerant gas |
| 4. Shock—10 cycles of rapid transfer from 100°C to 0°C in the presence of a liquid refrigerant | Lead rate of less than 0.5g per annum of R12 refrigerant gas |

What is claimed is:

1. A connection between a plurality of fluid-conveying pipes comprising a first fluid-conveying pipe and a second fluid-conveying pipe, an end region of the second pipe being inserted into an end of the first pipe to form an overlap region of the pipes, a hollow open-ended polymeric tube which is located, and has been dimensionally recovered by the application of heat thereto, over at least part of the overlap region so that it encloses the end of the first pipe and part of the second pipe, at least one bonding insert formed from a thermosetting adhesive located inside the tube, and at least one barrier insert located inside the tube adjacent to the bonding insert and supported by and in contact with the tube such that, when the device was heated, the barrier insert restricted the flow of fused thermosetting adhesive of the bonding insert away from the overlap region so that the adhesive flowed into the overlap region via the end of the first pipe to form a permanent bond between the fluid-conveying pipes.

2. A device as claimed in claim 1 wherein the second elongate object is hollow.

3. A device for connecting a plurality of elongate objects, which comprises a hollow open-ended tube which is at least partly dimensionally recoverable, at least one bonding insert formed from a solid, fusible, thermosetting adhesive located inside the tube for providing a permanent bond between a plurality of objects to be connected, and at least one barrier insert located inside, and supported by, the tube to restrict the flow of fused thermosetting adhesive when the device is heated, wherein the building insert and barrier insert are in a side-by-side relationship with substantially no gap between them, each barrier insert is attached to its respective bonding insert, and the barrier insert is in the form of a ring having a flange portion that extends axially from the periphery of the ring so that the flange portion extends over one end face and at least part of an outer circumferential surface of the bonding insert.

4. A device as claimed in claim 3, in which the thermosetting adhesive has a melt viscosity in the range of 25 to 400 poise when heated to 150° C.

5. A device as claimed in claim 3, in which the thermosetting adhesive is an epoxy resin.

6. A device as claimed in claim 3, in which the tube has a quantity of adhesive on at least part of its inner surface to provide at least a temporary bond between the tube and at least one of the elongate objects to be inserted therein.

7. A device as claimed in claim 6, in which the quantity of adhesive in the inner surface of the tube comprises a hot-melt adhesive.

8. A device as claimed in claim 3, in which the barrier insert comprises a material which is capable of fusing or deforming during installation of the device.

9. A device as claimed in claim 8, in which the melt viscosity of the material of the insert is higher than the melt viscosity of the thermosetting adhesive.

10. A device as claimed in claim 3, in which at least one of the bonding insert and the barrier insert is in the form of a ring.

11. A device as claimed in claim 5, in which the thermosetting adhesive is an epoxy resin.

12. A device for connecting a plurality of elongate objects, which comprises a hollow open-ended tube which is at least partly dimensionally recoverable, at least one bonding insert formed from a solid, fusible, thermosetting adhesive located inside the tube for providing a permanent bond between a plurality of objects to be connected, and at least one barrier insert located inside the tube to restrict the flow of fused thermosetting adhesive when the device is heated, wherein the tube has a quantity of adhesive on at least part of its inner surface to provide at least a temporary bond between the tube and at least one of the elongate objects to be inserted therein and a protective tube covers at least part of the inner surface of the quantity of adhesive that provides at least a temporary bond between the tube and at least one elongate object.

13. A device as claimed in claim 12, wherein the protective tube formed an integral part of the barrier insert.

14. A device as claimed in claim 12, in which the thermosetting adhesive has a melt viscosity in the range of 25 to 400 poise when heated to 150° C.

15. A device as claimed in claim 12, in which the tube has a quantity of adhesive on at least part of its inner surface to provide at least a temporary bond between the tube and at least one of the elongate objects to be inserted therein.

16. A device as claimed in claim 15, in which the quantity of adhesive in the inner surface of the tube comprises a hot-melt adhesive.

17. A device as claimed in claim 12, in which the barrier insert comprises a material which is capable of fusing or deforming during installation of the device.

18. A device as claimed in claim 17, in which the melt viscosity of the material of the insert is higher than the melt viscosity of the thermosetting adhesive.

19. A device as claimed in claim 12, in which at least one of the bonding insert and the barrier insert is in the form of a ring.

20. A device for forming a sealed connection between a first fluid-conveying pipe and a second fluid-conveying pipe in which an end region of the second pipe is inserted into an end of the first pipe to form an overlap region between the pipes, which device comprises a hollow, open-ended polymeric tube that is at least partly heat-shrinkable, at least one bonding insert formed from a solid, fusible, thermosetting adhesive, the bonding insert being located inside, and supported by, the heat-shrinkable tube, and at least one barrier insert located inside the tube adjacent to the bonding insert and supported by the tube, such that when the device is positioned around the overlap region between the pipes with the inserts positioned around the exterior surface of the second pipe and the bonding insert abutting the end of the first pipe, and the device is heated, the tube recovers and the thermosetting adhesive of the bonding insert fuses, the barrier insert restricting flow of the adhesive away from the overlap region so that the adhesive flows into the overlap region via the end of the first pipe to form a permanent bond between the fluid-conveying pipes.

21. A device as claimed in claim 20, wherein the thermosetting adhesive has a melt viscosity in the range of 25 to 400 poise when heated to 150° C.

22. A device as claimed in claim 20, wherein the thermosetting adhesive is an epoxy adhesive.

23. A device as claimed in claim 20, wherein the tube has a quantity of adhesive on at least part of its inner surface to provide at least a temporary bond between the tube and at least one of the elongate objects to be inserted therein.

24. A device as claimed in claim 23, wherein the quantity of adhesive on the inner surface of the tube comprises a hot-melt adhesive.

25. A device as claimed in claim 24, wherein the hot-melt adhesive is a polyamide adhesive.

26. A device as claimed in claim 20, wherein the tube is formed from a material having an elastic modulus of at least 250 MPa.

27. A device as claimed in claim 26, wherein the material is selected from the group consisting of cross-linked polyvinylidene fluoride and a cross-linked polyamide.

28. A device as claimed in claim 20, wherein the barrier insert has a melt viscosity higher than the melt viscosity of the thermosetting adhesive.

29. A device as claimed in claim 20, wherein the barrier insert is fusible or deformable at the temperature required to produce an adequate level of cure in the thermosetting adhesive.

30. A device as claimed in claim 29, wherein the barrier insert is fusible or deformable within the temperature range of 100°–200° C.

31. A device as claimed in claim 29, wherein the melting point range of the barrier insert is no more than 40° C.

32. A device as claimed in claim 20, wherein the barrier insert is a thermoplastic polymer.

33. A device as claimed in claim 32, wherein the thermoplastic is a polyamide.

34. A device as claimed in claim 33, wherein the polyamide is selected from the group consisting of nylon 11 and nylon 12.

35. A device as claimed in claim 20, wherein the bonding insert is in the form of a ring.

36. A device as claimed in claim 20, wherein the barrier insert is in the form of a ring.

37. A device as claimed in claim 20, wherein the bonding insert and barrier insert are in a side-by-side relationship with substantially no gap between them.

38. A device as claimed in claim 37, wherein each barrier insert is attached to its respective bonding insert.

39. A device as claimed in claim 20, wherein a portion of the tube at or near one end region thereof is partially recovered.

* * * * *